United States Patent
Hultkrantz et al.

(10) Patent No.: US 8,737,968 B2
(45) Date of Patent: May 27, 2014

(54) METHOD AND SYSTEM FOR HANDLING A MULTI-MEDIA CALL SETUP REQUEST

(75) Inventors: Jan C. G. Hultkrantz, Bromma (SE); Jan Lidin, Segeltorp (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 473 days.

(21) Appl. No.: 13/262,463

(22) PCT Filed: Apr. 3, 2009

(86) PCT No.: PCT/EP2009/002444
§ 371 (c)(1),
(2), (4) Date: Dec. 12, 2011

(87) PCT Pub. No.: WO2010/112047
PCT Pub. Date: Oct. 7, 2010

(65) Prior Publication Data
US 2012/0075406 A1    Mar. 29, 2012

(51) Int. Cl.
*H04W 4/12*        (2009.01)
*H04N 7/14*        (2006.01)
*H04M 11/00*       (2006.01)

(52) U.S. Cl.
USPC ............. 455/412.2; 348/14.02; 379/88.13

(58) Field of Classification Search
CPC ..... H04M 7/00; H04M 3/42; H04M 15/8228; H04M 11/00; H04L 65/1069; H04L 65/1006; H04L 65/1009; H04L 69/24; H04Q 2213/1307; H04Q 2213/13248; H04Q 2213/13337; H04Q 11/0478; H04N 7/14; H04W 4/12

USPC .............. 455/412.2; 348/14.02; 379/88.13
See application file for complete search history.

(56) References Cited

U.S. PATENT DOCUMENTS

| | | | |
|---|---|---|---|
| 8,411,597 B2* | 4/2013 | Jin et al. ................... | 370/261 |
| 8,582,726 B2* | 11/2013 | Laiho et al. ............... | 379/88.13 |
| 2008/0146224 A1 | 6/2008 | Miyashita | |
| 2010/0240344 A1* | 9/2010 | Jin et al. ................... | 455/412.2 |
| 2011/0221858 A1* | 9/2011 | Laiho et al. ............... | 348/14.02 |

FOREIGN PATENT DOCUMENTS

| | | |
|---|---|---|
| EP | 0583094 A2 | 2/1994 |
| JP | 3120944 A | 5/1991 |
| JP | H07030871 A | 1/1995 |
| JP | 2001309086 A | 11/2001 |
| JP | 2004221738 A | 8/2004 |
| WO | 02/052811 A1 | 7/2002 |
| WO | 2006104040 A1 | 10/2006 |

\* cited by examiner

*Primary Examiner* — Mohammad Islam
(74) *Attorney, Agent, or Firm* — Coats & Bennett, PLLC

(57) ABSTRACT

A service node in a telecommunication network is arranged to receive a Multi-Media video call setup for a terminal to be called. The called terminal is called by the service node according to either a video or a voice call setup, depending on a current allowed answer mode of the called terminal. Responding to the call setup will, depending on either answering or rejecting the call setup by the called terminal, and depending whether the call setup is for a voice or a video call, be handled by the service node according to a predetermined method. When a call setup is answered by the called terminal, the service node further supports a method of toggling between a video call and a voice call at the called terminal.

14 Claims, 11 Drawing Sheets

Response on alert flow

METHOD AND SYSTEM FOR HANDLING A MULTI-MEDIA CALL SETUP REQUEST

TECHNICAL FIELD

The present invention relates to a method and system for handling a Multi-Media call setup request by a calling terminal towards a called terminal in a telecommunication network, wherein a media control node controls a switching action according to a response of the called terminal.

BACKGROUND

Traditional Circuit Switched (CS) telecommunication networks, such as Public Switched Telecommunication Network (PSTN) or Integrated Services Digital Network (ISDN) have been supplemented by Public Land Mobile Networks (PLMN) implemented as e.g. a Global System for Mobile communications (GSM), Wideband—Code Division Multiple Access (W-CDMA) or Time Division—Synchronous Code Division Multiple Access (TD-SCDMA). The PLMN networks do nowadays also support Packet Switched (PS) telecommunication for e.g. establishing Internet Protocol (IP) connections, allowing enriched communication such as voice and video.

Voice calls, regarded as a traditional communication method, provide a level of interactive communication, however video as medium took off as a higher level and more sophisticated way of communication.

Standards, such as the 3G-324M adopted by the 3rd. Generation Partnership Project (3GPP), have been defined to support conversational Multi-Media over CS networks. The International Engineering Task Force (IETF) has defined a Session Initiation Protocol (SIP) to support Multi-Media calls to be initialized over IP based PS networks.

When a called party answers a 3G-324M video telephony call setup on its terminal both a video channel and an audio channel are established after a call setup.
If the called party does not have hands-free enabled, the loud-speaker in the terminal of the called party will be activated, play out audio from the calling party, and audio captured from the terminal of the called party will be sent over an audio channel to the terminal of the called party.

The camera in the terminal of the called party (e.g. a front camera at a mobile phone) will be activated when the call setup is answered and the captured video is sent to the terminal of the calling party via the video channel.

However, the arrival of the more sophisticated way of communication by video also has a disadvantage in that the privacy of the called party when answering a video call setup incurs a risk. When a video call setup is answered in a non-private area, the video screen might disclose a scene, that is not intended for others. The same remark is valid for the automatic launch of the camera at the terminal of the called party, possibly providing the calling party with a private scene of the called party.

As to benefit from video capabilities of the terminal a called party might adapt configuration options or settings of the terminal in relation to a current privacy situation.

Even if the called party is familiar with the configuration options of the terminal for an incoming video call setup, there might be situations which do not allow the user, or at least allow fast enough, to adapt the configuration options of the terminal, possibly resulting in a privacy intrusion.

Additionally, the automatic launch of the loud-speaker in the terminal of the called party, as provided by the 3G-324 standard, might be non desired when answering a video call in a non private area. Without a hands-free device and in a common case a call setup is answered without checking if is a video call setup and the automatic launch of the loudspeaker becomes intrusive.

The personal intrusion problem that the implementation of video calls causes is regarded as a barrier for the growth of video telephony.

SUMMARY

In view of the above problems it is therefore an object to provide a method and system for responding to a Multi-Media call setup request in a telecommunications network.

A method for handling a Multi-Media call setup is described wherein by means of a media control entity a number of steps is performed. The media control entity is part of a telecommunication network as well as a media switching entity controlled by the media control entity, and a calling and a called terminal, both capable to perform Multi-Media calls. The calling terminal initializes a Multi-Media call setup, hence the calling terminal, and the called terminal represents the called terminal. A Multi-Media call comprises a call with a plurality of media types among others video, audio, text or data which can be transferred simultaneously.

The steps performed by the media control entity comprise:
a) reception of a Multi-Media call setup request that is initialized by the calling terminal,
b) the retrieval of an information that indicates for which of the media types a call setup to the called terminal is allowed,
c) the setup of a subsequent call to the called terminal,
d) the reception of a response to the subsequent call setup, wherein this response is initialized by the called terminal
e) providing an instruction to the media switching entity for switching the Multi-Media call, wherein the provided instruction depends on the allowed media type and the response initialized by the called terminal. The provided instruction results in a specific switching of the Multi-Media call as initialized by the calling terminal where the Multi-Media call is among others switched to the subsequent call, a video source under control of the called terminal, or a mailbox associated with the called terminal. The mailbox type can be of a specific type such as a voice mailbox, also known as voicemail, or a video mailbox.

Additionally the media control entity is described. This media control entity is arranged for handling the Multi-Media call setup that is initialized by the calling terminal towards the called terminal. This media control entity is, together with the media switching entity controlled by the media control entity, and the calling and called terminal, both capable to support Multi-Media calls, being part of the telecommunications network. The calling terminal initializes a Multi-Media call setup. A Multi-Media call is regarded to comprise a call with a plurality of media types among others video, audio, text or data which can be transferred simultaneously. The Media control entity is communicatively connected to both terminals.

The media control entity comprises a selecting unit suitable for selecting an information from a database unit. This information indicates for which media type a call setup to the called terminal is allowed.

The media control entity is arranged to initialize a setup of a subsequent call to the called terminal of a media type as indicated by the selected information. The media control entity is also arranged to receive a response that is initialized by the called terminal, and the media control entity is arranged to instruct the media switching entity to switch the Multi-Media call, depending on the allowed media type and the response initialized by the called terminal.

Additionally a terminal device arranged for performing Multi-Media calls in a telecommunication network is described. The network also comprises the media control entity and is communicatively connected to the terminal device. The terminal device is arranged for signaling the media control entity to perform a rejection or release of a connection of a first media type or a call setup for a first media type, such that the connection or call setup between the media control entity and the terminal device is released. The signaling as initialized by the terminal device results into a call set up of a second media type towards the terminal device of a different media type then the first media type.

The invention provides the advantage to a user of a Multi-Media capable mobile terminal to receive a Multi-Media call setup but answer this Multi-Media call setup as a single media call setup, e.g. as a voice call, with a single action at the terminal, providing the user a feature to instantly decide to answer the call setup as e.g. a voice call setup when it is not appropriate to answer the call setup as a Multi-Media.

The invention provides the further advantage that during an established call a single action such as pressing a button at the terminal of the called party, initiates a sequence to toggle the current media call type e.g. a voice connection to a video connection and vice versa. This single key allows an easy, swift and secure switch between both call media types.

A still further advantage is that answering of a video call setup according to the invention has the advantage that a user which frequently changes its terminal type does not have to know the terminal specific settings to allow or block video, but instead a single setting made e.g. via the internet or by means of calling a service number enables the user to control his answer mode.

A still further advantage that implementation of the invention offers is that the method can be applied with state of the art terminals, not requiring an adaptation, and where a function such as the reject action by means of e.g. the "no" button has an understandable result to the user, in that the current alert for e.g. a video call setup is by application of the invention exchanged to an alert for e.g. a voice call setup.

In the following, advantageous embodiments of the present invention shall be described with reference to the enclosed drawings in order to give the skilled person a full and complete understanding. However these embodiments are illustrative and not intended to be limiting.

DETAILED DESCRIPTION

Due to standardization efforts with 3G-324M for Multi-Media communication and Session Initiation Protocol (SIP) it is regarded a common feature to have communication with voice and video media when networks and terminals are connected to each other and capable to operate according to these standards.

At this description the term "voice" or "voice call" means that an audio channel is to be established, whereas the term "video" or "video call" means that a video channel and an audio channel are to be established.

Video and audio content is transferred as streams via the video and audio channels respectively. The word "stream" is to be understood as comprising a single any directional or bidirectional stream.

The term "Multi-Media" is to be understood as denoting two or more media. In this description a video call setup and an established video call comprising an audio and a video stream is used as an example of a Multi-Media call. A Multi-Media device is capable to handle simultaneously two or more media, such as an audio and a video stream.

The term "setting up a call", "call setup" or just "call" as a verb as a common term used at the CS technology environment is in this description regarded equal to the term "setting up a media session" as a common term used at the PS technology environment. "Setting up a call" and "setting up a media session" all mean the initializing steps that, if successful, result into a communication connection between the entities involved.

The word "call" as a noun means an established channel, generally resulting from an accepted call setup. A call as noun is regarded as a call leg, as applicable to this description below where multiple legs are present.

A connection is implemented as a channel suitable for the specific stream it has to support between two terminating points. The single channel can be provided along multiple call legs or connecting equipment.

A terminal also known to a person skilled in the art as communication device can be wired or wireless. Implementations of wireless terminals are e.g. User Equipment (UE), Mobile Station (MS), mobile or wireless phones or mobile computers.

The invention will be explained by application of mobile terminal operating within a Wideband—Code Division Multiple Access (W-CDMA) network for access and switching of calls, although the invention is regarded applicable to other mobile networks such as TD-SCDMA or to fixed networks such Public Switched Telephone Network (PSTN).

At the embodiments shown, both SIP and H.245 communication setup protocols are depicted. These protocols are just used as an example as to implement the invention with available telecommunication products.

Figure 1:
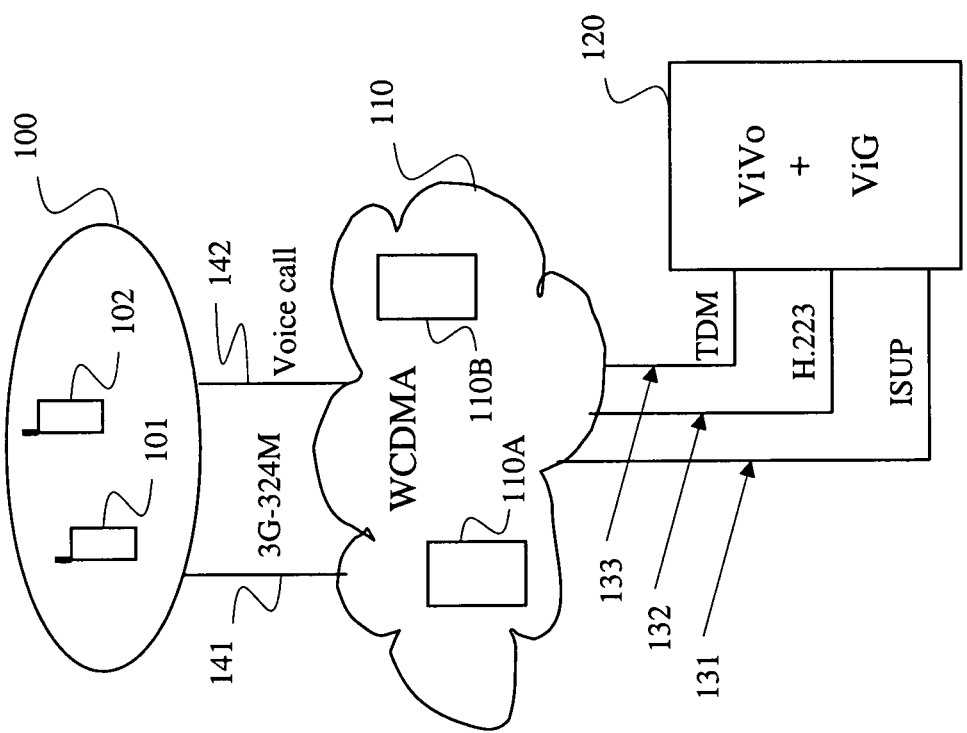
FIG. 1 is a schematic diagram representing a telecommunication network comprising Circuit Switched terminals, a Circuit Switched W-CDMA network and Circuit Switched interfaced Media Switching Node.

In FIG. 1 the W-CDMA access and W-CDMA network 110 is schematically drawn, connected to a first radio environment 100 with terminals 101, 102. Connections 141, 142 constitute connections between the W-CDMA network 110 and the radio environment 100.

FIG. 1 shows additionally a new node 120 connected to the W-CDMA network 110 by means of connections 131, 132 and 133. The W-CDMA network 110 comprises switching network nodes such as Mobile Switching Center (MSC) nodes 110A and 110B.

The new node 120 comprises a control, gateway and switching functions, capable for switching audio and video channels. A combined gateway and switching function comprised by node 120 that is capable of connecting audio and video channels will be named in this description as a Media Switching Entity or "Video Gateway" (ViG).

A Media Control Entity, also comprised by the new node 120 is listed in this description a "Video call setup with Voice/Video control function", abbreviated in this description as "ViVo" and applied in all further embodiments. The ViVo is arranged to control the ViG, and the ViG is arranged to provide signaling information to the ViVo. Node 120 is applicable to all embodiments and will be denoted in the description as ViG+ViVo 120, comprising ViVo 120A and ViG 120B, depending on the function(s) to be elucidated. The functionality of the ViG+ViVo 120 might also be comprised by several network nodes or as a distributed network service or integrated into a network node as a Mobile Switching Center 110A, 110B.

The drawings contain W-CDMA network switching nodes 110A and 110B as separate entities, but for the ease of explanation switching actions performed by the nodes 110A and 110B are listed as a switching action of the W-CDMA network.

FIG. 1, as well as the other figures, focuses on the issues required for explaining the invention, hence network entities not regarded as helpful for explanation are not depicted nor mentioned at the description.

As an example network entities of the radio environment 100 with e.g. its Base Stations, also known as Node-B's are not depicted.

Figure 2:
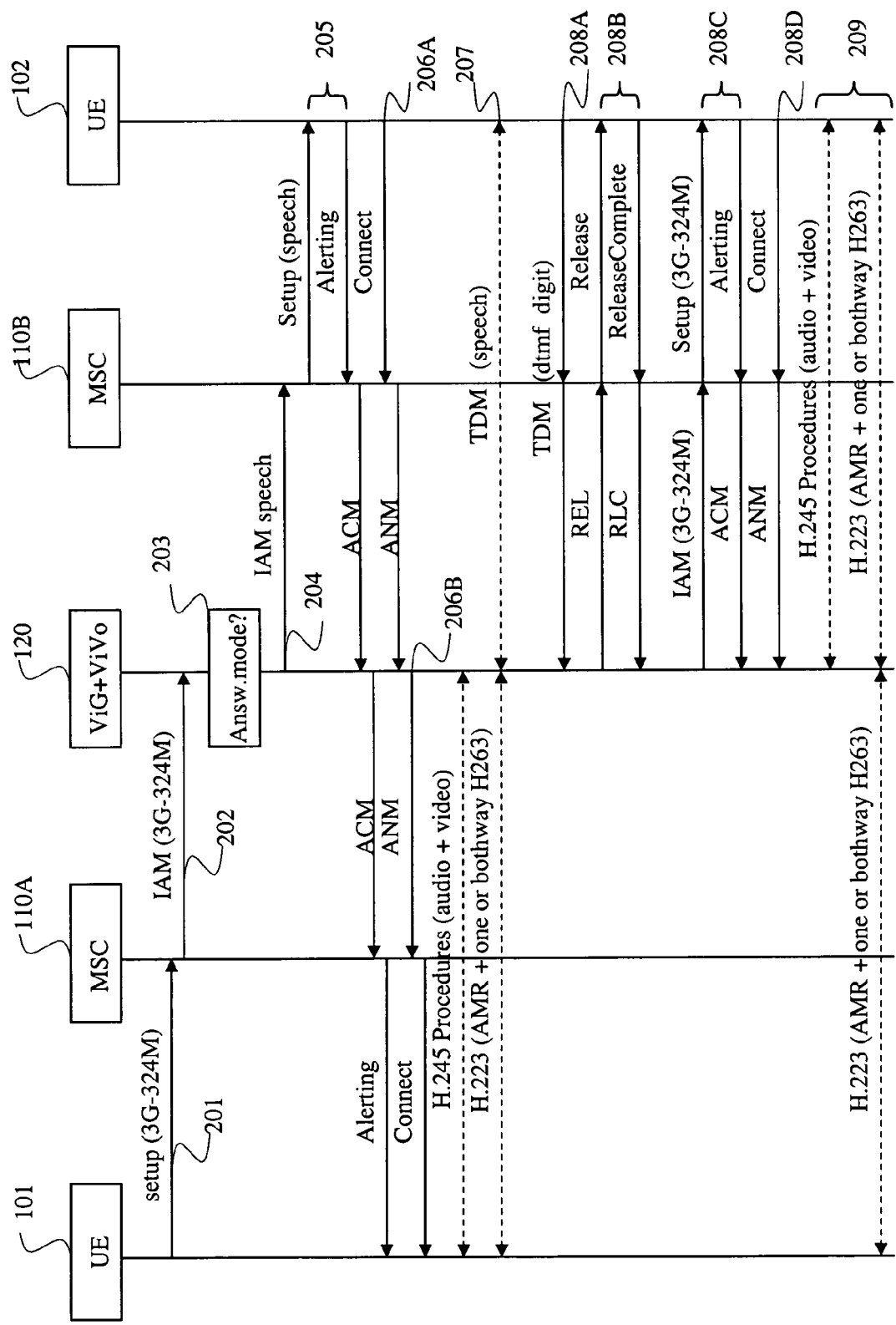
FIG. 2 is a schematic diagram of a Multi-Media call setup flow according to a voice answer mode in a circuit switched network.

FIG. 2 describes a video call setup flow according to the invention, using the network elements depicted in FIG. 1.

At the setup 201 of a communication session applying a video medium, here denoted as a video call setup, both a video channel and an audio channel are established at answering the video call setup. After answering the call setup the loud-speaker in the called terminal 102 will be activated, play out the audio from the calling terminal 101 and the audio captured from the called terminal 102 will be sent over the audio channel to the calling terminal 101.

The invention provides however that the video channel will, from a communication perspective, be handled differently compared to the audio channel.

The new call terminating service performed by ViG+ViVo 120, maintains a database comprising an information being implemented as a variable indicating a media type the called terminal 102 is currently allowing to be called for. This variable is hereafter named as "answer mode variable". The answer mode variable will in all embodiments comprise either "receive a video call setup as a voice call setup" or "receive a video call setup as a video call setup", hence the answer mode of the called terminal will be "voice" or "video".

When the video call setup is initialized 201 by the calling terminal 101, the video call setup request is forwarded 202 by the W-CDMA network 110 to the ViG+ViVo 120. Up to operators of telecommunication networks, optionally the W-CDMA network 110 forwards all video call setups to the ViG+ViVo 120, or only forwards video call setups to the ViG+ViVo 120 when the user of the called terminal 102 has subscribed to a service which enables selective video or voice answering of incoming video call setups according to the invention. Implementation of the latter method is e.g. enabled by requesting a Home Location Register (HLR) node comprised by the W-CDMA network 110 for a service profile of the subscribed user of the called terminal 102 by the MSC 110A.

The ViG+ViVo 120 receives 202 the forwarded video call setup request, the request comprising an address of the called terminal 102. The address of the called terminal 102 can be a Mobile Station Integrated Services Digital Network number of the called party (MSISDN). The address is subsequently applied by the ViG+ViVo 120 to select 203 the answer mode variable associated with the called terminal 102, from the database. Having selected 203 the answer mode variable the ViG+ViVo 120 instructs 204 the W-CDMA network 110, to set up a subsequent call of a voice or video media type as indicated by the answer mode variable associated to the called terminal 102. This description applies for all embodiments the media voice and video, although other media such as text, data or fax would be equally applicable. As an example the video media is implemented according to the 3G-324M standard.

If the answer mode variable associated with the called terminal is set to "receive a video call setup as a voice call setup" then ViG+ViVo 120 optionally also fetches the list of the e.g. 3G-324M optional audio and video codecs that are supported by the called terminal 102 that have been provisioned in the ViG+ViVo database. The ViG+ViVo 120 uses this list of codecs when negotiating codecs for the video call between ViG+ViVo and the calling terminal 101. In this way the selection of codecs can be made to a higher quality level than selection of the mandatory default codecs in e.g. 3G-324M for a video call. I.e. the same codecs will be used as when the called terminal 102 is negotiating a video call itself which is the case when the answer mode variable in the ViG+ViVo database is set to "receive a video call setup as a video call setup".

By application of the ViG+ViVo 120 as a call setup answer control function, the user of the called terminal 102 is equipped with a convenient tool to have a setup of a video call answered in several ways according to the setting of the answer mode variable and the response action of the user of the called terminal 102.

When a video call setup is to be answered while being in public, it might be regarded as a privacy intrusion as the scene presented at the display of called terminal 102 is subject to a privacy intrusion where it is not always possible to screen the display of the called terminal 102 for others. This argument might be even more true when the called terminal 102 is e.g. a laptop screen.

When the answer mode variable is set to indicate "receive a video call setup as a voice call setup", the ViG+ViVo 120 instructs 204 the W-CDMA network 110 to setup a subsequent call to the called terminal 102, with the address as indicated in the video call setup request 202, for a voice call as a medium.

The W-CDMA network 110 subsequently calls 205 the called terminal 102 accordingly to a voice call protocol, e.g. with a Signaling System 7 (SS7) protocol Initial Answer Message (IAM). When the called terminal 102 answers 206A, the W-CDMA network 110 signals the answer message back to the ViG+ViVo 120, which then subsequently signals 206B an answer message to the W-CDMA network 110, in response to the initial video call setup request 210.

Abbreviations ACM and ANM in this and subsequent figures mean Answer Complete Message and Answer Message respectively, and represent an acceptance of the call setup 204.

After both answer messages 206A & 206B, the W-CDMA network 110 connects the calling terminal 101 with a video and an audio channel to the ViG 120. Subsequently the ViVo 120A instructs the ViG to connect 207 the audio channels of the calling terminal 101 and the called terminal 102 with each other.

Effectively a transmission channel for audio is established via the ViG 120B under control of the ViVo 120A between the calling terminal 101 and the called terminal 102. Abbreviations AMR and TDM mean respectively Adaptive Multi Rate codec and Time Division Multiplexing.

The ViG 120B has connections to PS and CS networks and allows a situation where one of the terminals 101, 102 belongs to a PS domain and the other terminal to a CS domain.

In the case described above, a video stream generated at the calling terminal 101, will in case the called terminal 102 answers 206A, be discarded at the ViG+ViVo 120. However the user of the calling terminal 101 is served with a video stream or picture predetermined by the user of the called terminal 102, stored at a video source. The calling terminal 101 might in this way be provided with a generic video content or a personalized video content in relation to the user of calling terminal 101. Optionally the calling terminal 101 is provided with a predetermined avatar representing e.g. a human head, where lip, mouth or face movements are synchronized with the audio stream 207 provided by the called terminal 102. Submitting a video stream or picture from a video source to the calling terminal 101, is regarded as a personal greeting service.

The ViVo 120A, controlling the ViG 120, is arranged to detect by e.g. Dual Tone Multi Frequency (DTMF) signaling generated by the called terminal 102, additional requests for services from e.g. the user of the called terminal 102. As a result of the topology of the network configuration, the ViG+ViVo 120 is during a call 207 enabled to detect predetermined DTMF signaling 208A of the called terminal 102.

On detecting the predetermined DTMF signaling the ViVo 120A instructs the W-CDMA network 110 to release 208B the current voice connection between the ViG 120B and the called terminal 102 and requests the W-CDMA network 110 to set up 208C a new subsequent call to the called terminal 102 for a video connection.

Abbreviations REL and RLC mean Release Message and Release Complete Message respectively.

Accepting 208D the video call setup by the called terminal 102, or by a client application executed in the called terminal 102, results into an established second video channel by the W-CDMA network 110, between the ViG+ViVo 120 and the called terminal 102.

Subsequently the ViVo 120A instructs the ViG 120B to connect the first video channel established at step 207 between the calling terminal 101 and the ViG+ViVo 120, to the second video channel established at step 209 between the ViG+ViVo 120 and the called terminal 102. Effectively a video and audio channel is established between the calling terminal 101 and the called terminal 102 via the ViG 120.

In an analogue way a user of the called terminal 102 having a video call with calling terminal 101, has the ability during this established 209 video call, when entering a zone where his privacy is endangered, to initiate a switch back to a voice call, and later on switch back to a video call by pressing a predetermined key, while the calling terminal 101 maintains a video call to the ViG+ViVo 120.

A predetermined key, a dedicated key or a key of the keyboard e.g. #5 or a predetermined sequence of keys at the called terminal 102 is to be defined for switching the current connection from video to voice or vice versa. See FIG. 6 below, which describes a switch from video to voice for the called terminal.

During a switch 208B-208D from video to voice or vice versa by the called terminal 102, the ViG+ViVo 120 might be configured to play a predetermined video stream to the calling terminal, as the established 207 video channel will be maintained during a switching action of the called terminal 102. The predetermined video stream may have content to inform the user of the calling terminal 101 that the user at the calling terminal 102 is performing a switch to either a voice or video medium.

The answer mode variable, maintained at the database, is under control of the user of the called terminal 102 and may be changed to "receive a video call setup as voice call setup" or "receive a video call setup as a video call setup" by calling a service number or via the Internet where a portal with authentication means allows the user to view and manually change the current answer mode.

In the way, described above the user of the called terminal 102 is enabled to answer an incoming video call setup as a voice call setup and is provided with a simple means to switch back to video or again to voice media.

In case a user of the called terminal 102 rejects the incoming call setup such that the call has to be terminated at a mailbox of the user of the called terminal 102, occurring when a call setup for voice is rejected, there are two alternatives are applicable;

A) The W-CDMA network 110 forwards the call setup to the mailbox of the user of the called terminal 102. Under the condition that the user's mailbox with video or voice capabilities is connectable to the ViVo 120A that controls the ViG 120B the subsequent call setup 204, 205 will be looped back by the W-CDMA network 110 to the ViG+ViVo.

If the ViVo 120A detects that the outgoing subsequent call setup 204, 205 to terminal 102 corresponds to an incoming call setup to the mailbox as forwarded by the MSC 110B of the called terminal 102, the ViVo 120A signals a release of the call setup to the MSC 110B. The ViVo 120A utilizes the destination identity retrieved from said MDC 110B generated call setup to retrieve mailbox capabilities for the user of the called terminal 102. In this alternative the ViVo 120A is configured, depending on the type of the called party's mailbox to:

1) when the called party has a video mailbox; the ViVo 120A instructs the W-CDMA network 110 to initiate a video call setup to this video mailbox and subsequently instructs the ViG 120B to connect the video channel and the audio channel between the calling terminal 101 and this video mailbox as a mailbox call through a video gateway.

2) when the called party has a voice mailbox; the ViVo 120A instructs the W-CDMA network 110 to initiate a voice call setup to this voice mailbox and subsequently instructs the ViG 120B to connect the audio channel between the calling terminal 101 and this voice mailbox as a mailbox call through a gateway entity.

B) The W-CDMA network 110 does not forwards the call setup to the ViVo 120A but signals a rejection of the called terminal 102 back to the ViVo 120A. Under the condition that the user's mailbox with video or voice capabilities is connectable to the ViVo 120A that controls the ViG 120B and that ViVo 120A is configured to retrieve also the destination identity and the capabilities of the mailbox of the user of the called terminal 102 the mailbox type alternatives 1) and 2) mentioned above at alternative A) are applicable for the remainder of the call setup.

It is an option to implement the ViG+ViVo 120 and the mailbox in one network entity as to provide a direct interface relieving the W-CDMA network 110 from switching actions and in case of a video mailbox, reduction of bandwidth allocation. Additionally Video Ring-Back tone or Personal Greeting applications are optionally implemented in the ViG+ViVo 120 wherein source information for the Ring-Back tone content is locally available to the ViG+ViVo 120 for playing out to the calling terminal 101.

Figure 3:
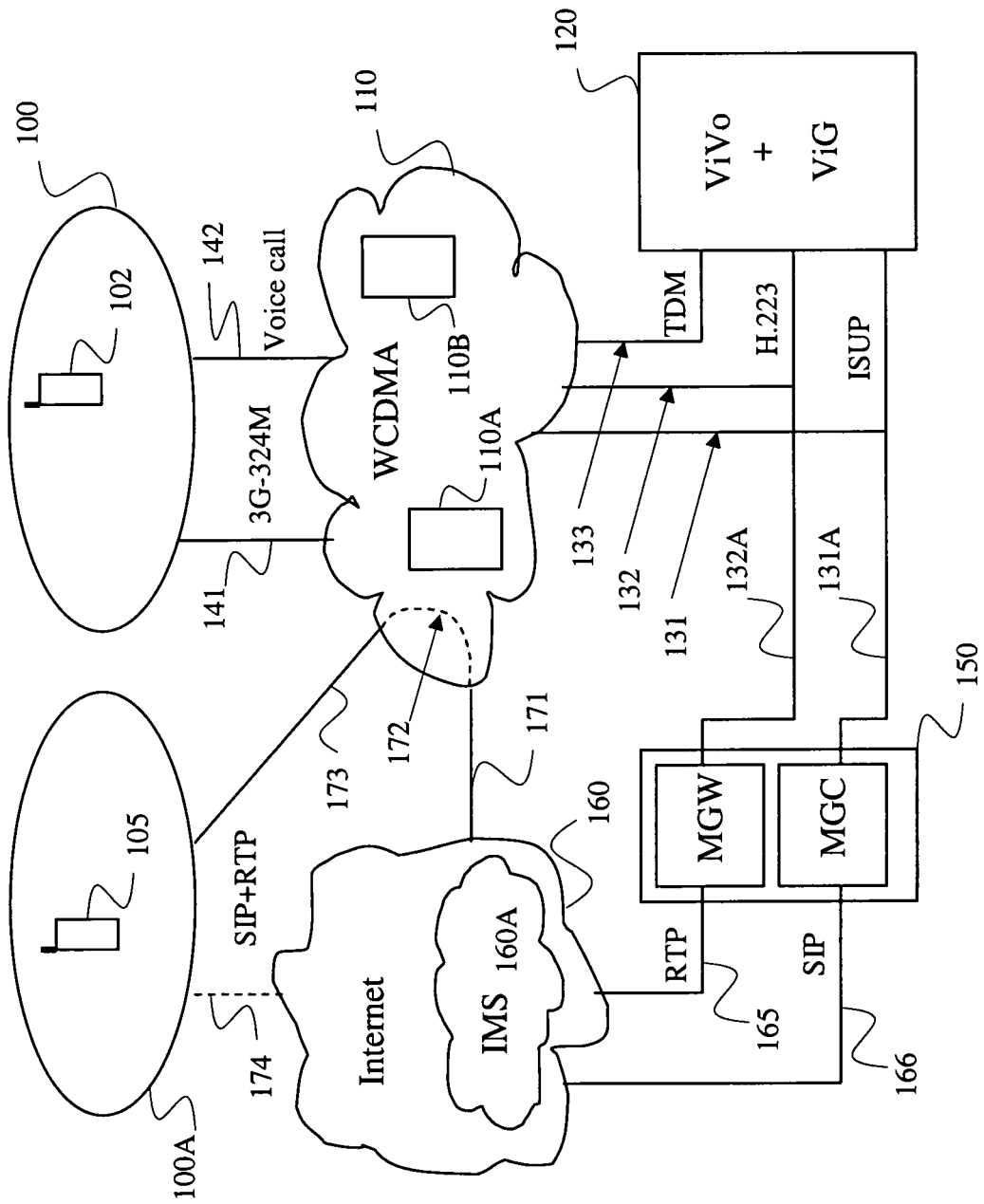
FIG. 3 is a schematic diagram representing a telecommunication network comprising Circuit- and Packet Switched terminals, a Circuit Switched W-CDMA network, a Packet switched network and a Circuit Switched interfaced Media Switching Node.

FIG. 3 is a schematic diagram representing a telecommunication network comprising Circuit- and Packet Switched terminals, a Circuit Switched W-CDMA network, a Packet switched network and a Circuit Switched interfaced Media Switching Node.

Additionally to FIG. 1, FIG. 3 shows a calling terminal 105 applying a SIP and a Real-Time Transfer Protocol (RTP) for signaling and media transport. The SIP terminal 105 is part of radio environment 100A representing a terminal environment directed to PS communication technology and supported via connection 173 by the access network part of the W-CDMA network 110. In case the SIP terminal 105 is a fixed device, connection 174 can alternatively be used for connection to the Internet 160

The W-CDMA network 110 has a breakout connection 171 to the internet 160, such that the SIP terminal 105 can connect to an Internet Multi-Media Subsystem (IMS) network 160A comprised by the Internet 160. The connection within the access part of the W-CDMA network 110 between SIP terminal 105 and the IMS network is schematically represented by connection 172.

The IMS network 160A comprises typically the IMS entities for establishing calls, such as a Proxy Call Session Control Function (P-CSCF), the Interrogating Call Session Control Function (I-CSCF) and Serving Call Session Control Function (S-CSCF).

A Media GateWay (MGW) function 150 is provided as a separate network entity, connecting with the Internet 160 by means of the connections 165 and 166 and to the W-CDMA network 110 and the ViG+ViVo 120 with Circuit Switched connections 131A, 132A.

Figure 4:
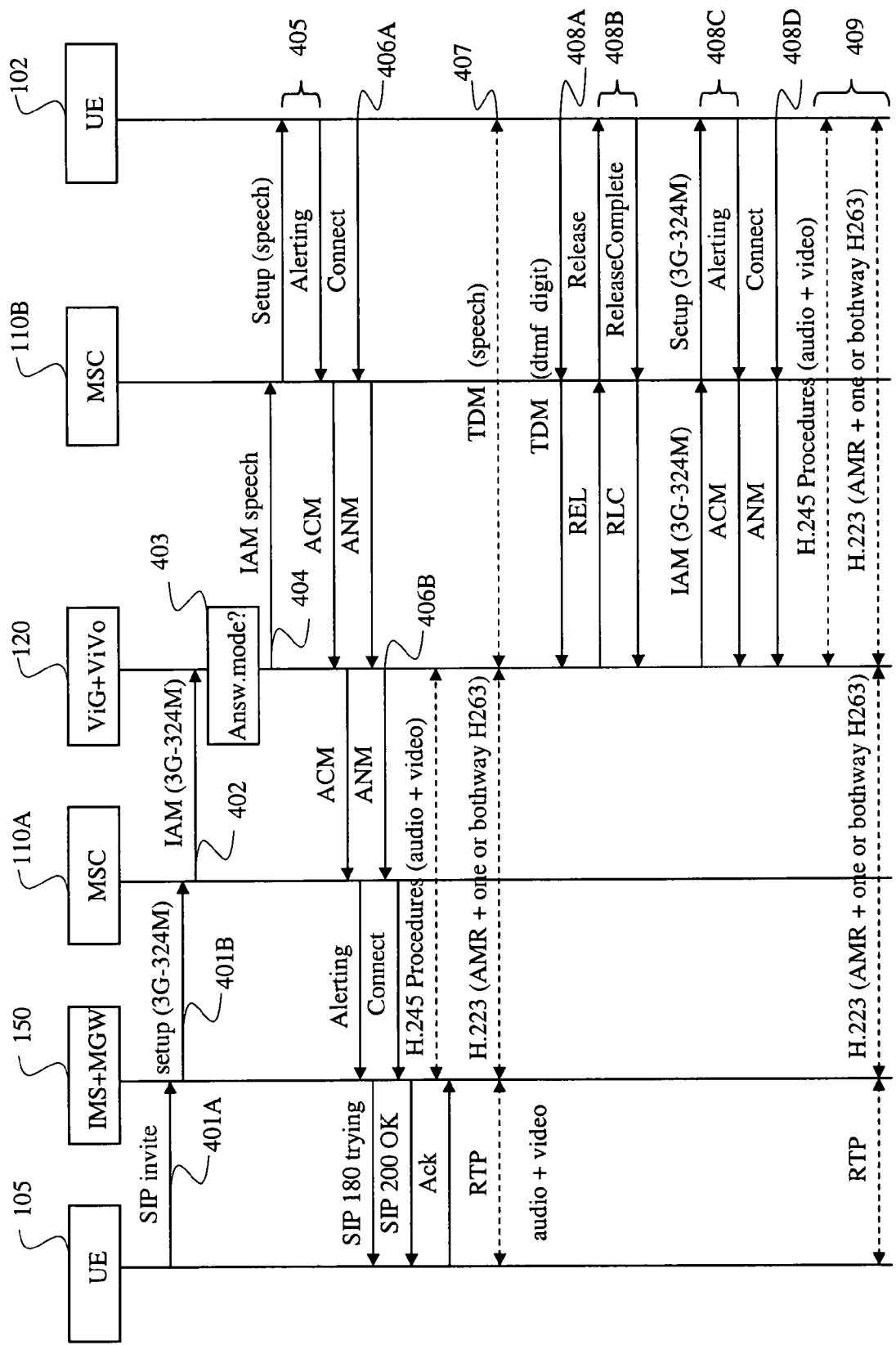
FIG. 4 is a schematic diagram of a Multi-Media call setup flow according to a voice answer mode in a circuit- and packet switched network, where the calling terminal is a Packet Switched terminal, and where the Media Switching Node is Circuit Switched interfaced.

The configuration as shown in FIG. 3 allows video calls to be setup by PS based terminals 105 to CS based terminals 102, elucidated by the description of FIG. 4.

FIG. 4 is a schematic diagram of a Multi-Media call setup flow according to a voice answer mode in a CS and PS network, where the calling terminal is a PS terminal, and where the Media Switching Node is CS interfaced, as depicted in FIG. 3.

Additionally to FIG. 2, FIG. 4 shows schematically the steps of a video call setup according to the invention, using the network elements depicted in FIG. 2, wherein the calling terminal 105 is a SIP terminal applying a SIP and a RTP for signaling and media transport.

When a video call setup is initialized 401A by a calling SIP terminal 105 towards the called terminal 102 of a CS technology type, the access part of the W-CDMA network 110 receives the request via connection 173 and forwards, schematically depicted as connection 172, the request to the IMS network 160A via connection 171.

The IMS network determines that the call is to be setup to a CS terminal outside the Internet 160 and submits a corresponding call setup request to the MGW 150 via connection 166. Depending on the configuration of the network, the call setup request is either forwarded to a predestined network switching entity of the W-CDMA network 110, such as an MSC or Gateway MSC (GMSC) 110A, or when the IMS network 160A has knowledge of the address of the ViG+ViVo 120, the Media Gateway entity 150 addresses the ViG+ViVo 120. In the latter case the call setup requests will be sent to the ViG+ViVo 120, whether or not the user of the called terminal 102 has a subscription to a service which enables a selective video or voice answering of incoming video call setups according to the invention.

FIG. 4 depicts a situation where the call setup request 401A is sent 401B by the MGW 150 to the MSC 110A, acting as GMSC comprised by the W-CDMA network 110, which MSC 110A has knowledge of the service number corresponding to the ViG+ViVo 120.

Again, up to the operators of telecommunication networks, optionally all video call setups are forwarded to the ViG+ViVo 120, or video call setups are only forwarded to the ViG+ViVo 120 when the user of the called terminal 102 has subscribed to a service which enables selective video or voice answering of incoming video calls according to the invention. Implementation of the latter method is e.g. enabled by requesting a HLR for a service profile of the user of called terminal 102, subscribed to the service, by the MSC 110A. The HLR being a node of the W-CDMA network 110.

The actions 402, 403, 404, 405 and 406A & 406B are equivalent to actions 202, 203, 204, 205 and 206A & 206B, of FIG. 2, disclosed above.

After receiving a connect message 406B, the MGW 150 connects the SIP terminal 105 in response to the initial call setup request 401A to the ViG 120. Subsequently the ViVo 120A instructs the ViG 120B to connect the audio channels of both connections to each other and at step 407 an audio channel is established between the calling SIP terminal 105 towards the called terminal 102, albeit a chain comprising a RTP, a H.223 and a TDM protocols.

Functional the remaining steps of switching between voice and video 408A, 408B, 408C, 408D and 409 have no influence on the calling terminal 105, apart from the already discussed play out of a video-stream when the called terminal 102 is switching or has a voice connection. Steps 408A, 408B, 408C, 408D and 409 are equivalent to steps 208A, 208B, 208C, 208D and 209 discussed at FIG. 2.

As already described in FIG. 2, also here a predetermined key, a dedicated key or a key of the keyboard e.g. #5 or a predetermined sequence of keys at the called terminal 102 are to be defined for switching from voice to video or vice versa during the connection. See FIG. 6 for details regarding switching from video to voice for the called terminal 102.

Figure 5:
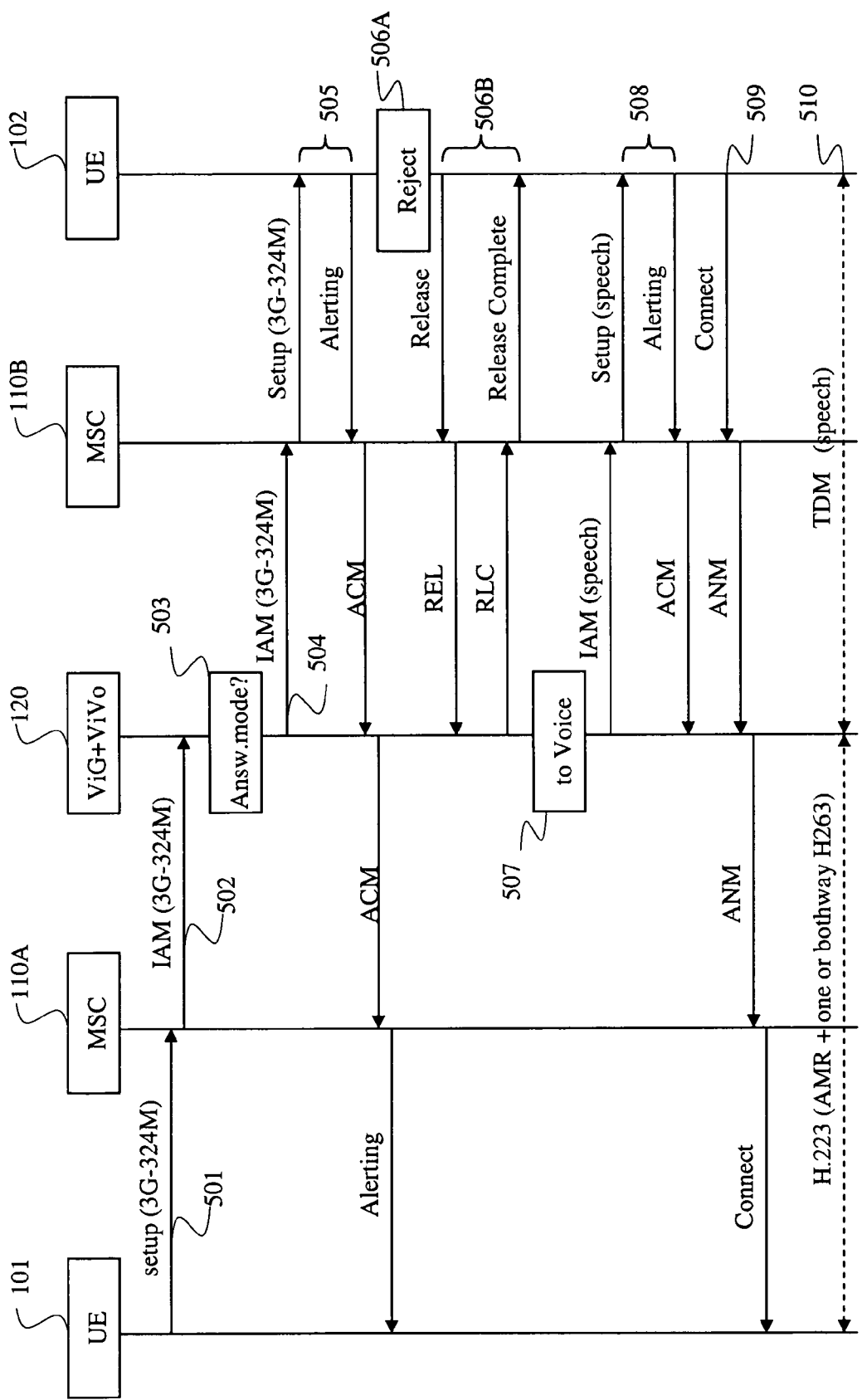
FIG. 5 is a schematic diagram of a Multi-Media call setup flow according to a video answer mode with call setup reject by the called party in a circuit switched network.

FIG. 5 is a schematic diagram of a Multi-Media call setup flow according to a video answer mode with call setup reject by the called party in a CS network.

FIG. 5 applies the network configuration depicted in FIG. 1 and presents the flow when a called terminal 102 responses to an alerted call setup for a video medium by rejecting the call setup. State of the art terminals may apply a "No" or "reject" button to signal the W-CDMA network 110 that the call setup should be halted.

In the light of the invention the reject action has different effects in relation to the current answer mode indicated by the answer mode variable.

A) The Multi-Media call setup is according to the answer mode variable of called terminal 102 to be alerted as a video call setup.

The video call setup by calling terminal 101, depicted as steps 501 and 502 are equivalent to the steps 201 and 202 of FIG. 2. When the answer mode variable indicates 503, as different from the method depicted at FIG. 2, that the call setup has to be initialized to the called terminal 102 as a video call setup, the ViVo 120A instructs 504 the W-CDMA network 110 to call the called terminal 102 with an alert 505 corresponding to a video call setup.

In this case the user of the called terminal 102, rejects 506A the call setup by e.g. a "No" button or a special adapted button for switching an incoming video call to a voice call. The rejection 506B is signaled by the W-CDMA network 110 to the ViVo 120A which subsequently determines 507 that a switch to a call for voice is requested and initiates 508 a subsequent call setup for voice by means of the W-CDMA network 110 towards the called terminal 102.

During the call setup 501-505 and after the rejection 506A-510 of the video call setup the calling party can be supplied with a video stream, as a personal greeting service, presented at the description of FIG. 2.

On an answer action by the user of called terminal 102, the connect is signaled 509 towards the ViG+ViVo 120, and subsequently the ViG+ViVo 120 signals the calling terminal 101 in response to the initial call setup 510 that an answer has occurred.

The W-CDMA network establishes a connection between the calling terminal 101 and the ViG 120, and establishes a connection between the ViG+ViVo 120 and the called terminal 102. The ViVo 120A instructs the ViG 120B to connect 510 both connections to each other, thereby establishing an audio channel from the calling terminal 101 to the called terminal 102 via the ViG+ViVo 120.

Figure 6:
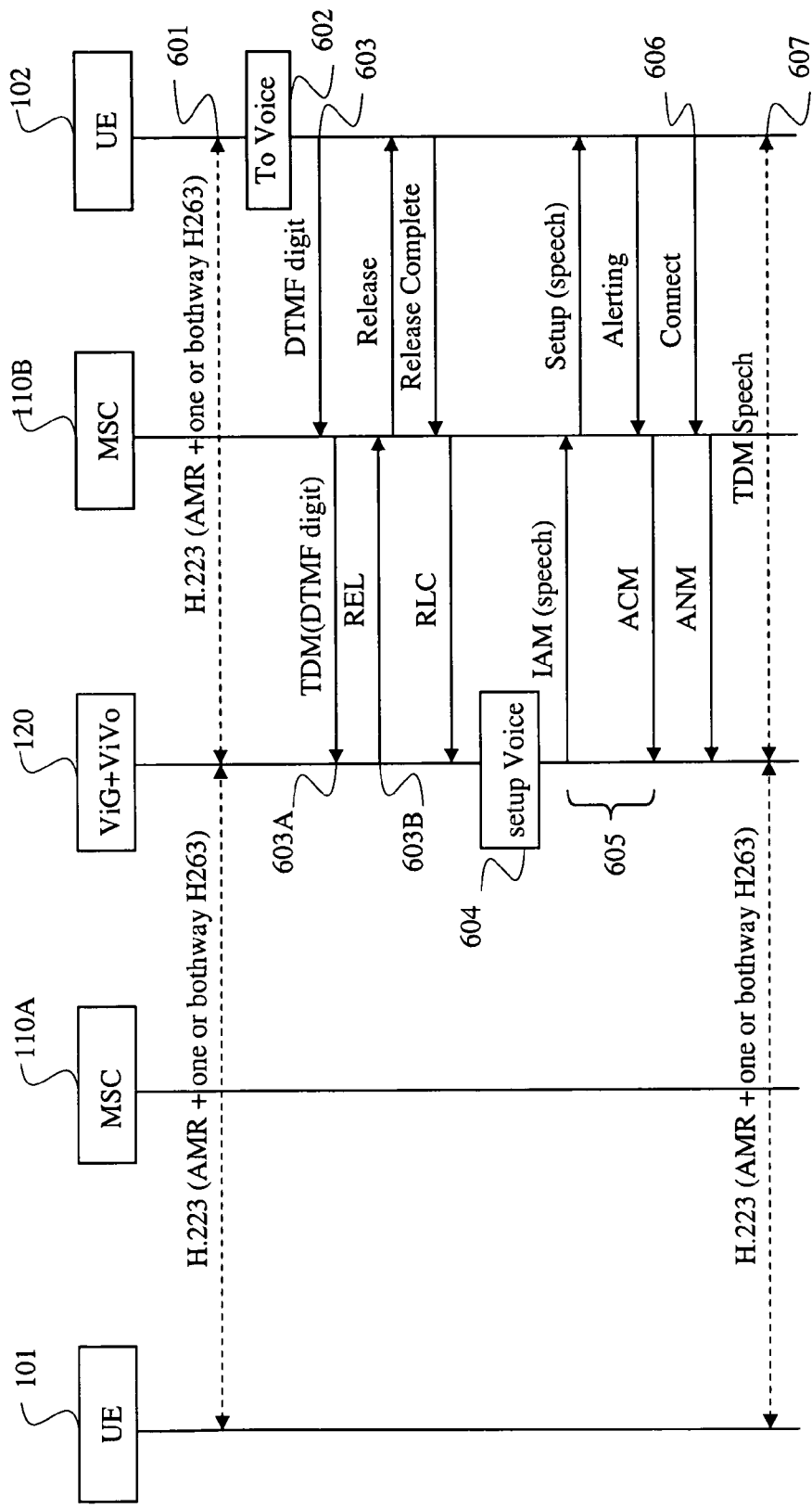
FIG. 6 is a schematic diagram of a Multi-Media call setup flow according to a video answer mode with a request to change the video call into a voice call.

After an audio channel to the called terminal 102 is established 510, the user of the called terminal 102 may request the ViG+ViVo 120 to switch to a video call as shown at FIG. 2 reference signs 208A-209, and back again to voice according to the description of FIG. 6 if required by privacy issues of the user of the called terminal 102. Switching between the voice and video modes can be implemented as presented at FIG. 2.

B) The Multi-Media call setup is according to the answer mode variable of called terminal 102 to be alerted as a voice call setup.

In this case a voice connection, as presented in the description of FIG. 2 is in an identical way setup to the called terminal 102, but on the rejection of the user of the called terminal 102, the ViG+ViVo 120 signals an answer message back to the originating MSC 110A. The description of FIG. 2 provides two alternatives for handling the rejected call setup. The first alternative describes that the W-CDMA network's terminating MSC 110B forwards the call setup to the called terminal 102 with a loopback to the ViVo 120A, and at the second alternative the ViVo detects the rejection of the called terminal 102.

Both said alternatives are equally applicable to the case described in FIG. 5.

FIG. 6 is a schematic diagram of a Multi-Media call setup flow according to a video answer mode with a request to change the video call into a voice call. This FIG. 6 intends to be a flow of steps applied in a network configuration of FIG. 1, but is also applicable to network configurations described in relation to FIGS. 3 and 7 with the required adaptations according to the invention.

FIG. 6 depicts an initial situation 601 where a video call between calling terminal 101 and called terminal 102 is established, which might be a final result of the procedure depicted at FIG. 2, reference sign 209, or FIG. 4, reference sign 409.

When the user of called terminal 102 decides to initiate 602 a switch to a voice call, a predetermined key, a dedicated key or a key of the keyboard e.g. #5 or string of keys is pressed at the called terminal 102 and a digit or a string of digits is transmitted 603 as DTMF signaling over the audio channel via the W-CDMA network 110, to the ViG+ViVo 120.

At reception 603A of the DTMF signaling the ViG+ViVo checks whether the received DTMF signaling is predetermined as a request for switching to a voice medium for the called terminal 102. In case the ViG+ViVo determines that a switch to voice is validly requested, the ViG+ViVo 120 instructs the W-CDMA network 110 to release 603B the video connection to the called terminal 120.

When the ViG+ViVo 120 determines 604 that a release complete signaling is received, a new subsequent call setup is requested 605 by the ViG+ViVo 120 but now for voice as medium. On an answer message received 606 from the called terminal 102, the W-CDMA network 110 establishes a voice connection 607 and subsequently the ViVo 120A instructs the ViG 120B to connect the audio channel of the connection between the calling terminal 102 to the ViG+ViVo 120 to the new establish audio channel between the ViG+ViVo 120 and the called terminal 102.

The answer 606 of the called terminal 102 is performed by e.g. pressing a button or automatically by a software client comprised by the called terminal.

Optionally the calling party may be informed during the switch action 601-607 of the switching action by a video content streamed from a video source under control of the ViG+ViVo 120, to the called terminal 102 by the same features as presented in the description to FIG. 2.

A video stream generated by calling terminal 102 after the call establishment 607 will be discarded at the ViG+ViVo 120.

Where in any of the embodiments above a connection 207, 209, 407, 409, 510, 601, 607 is established between the called terminal and the calling terminal the procedure toggle between the type of media may be repeated as required as elucidated above. On reception of a response initialized by the called terminal 102 the subsequent call is released and a further subsequent call to the called terminal 102 is setup, the subsequent call and the further subsequent call being of a different media type.

Figure 7:
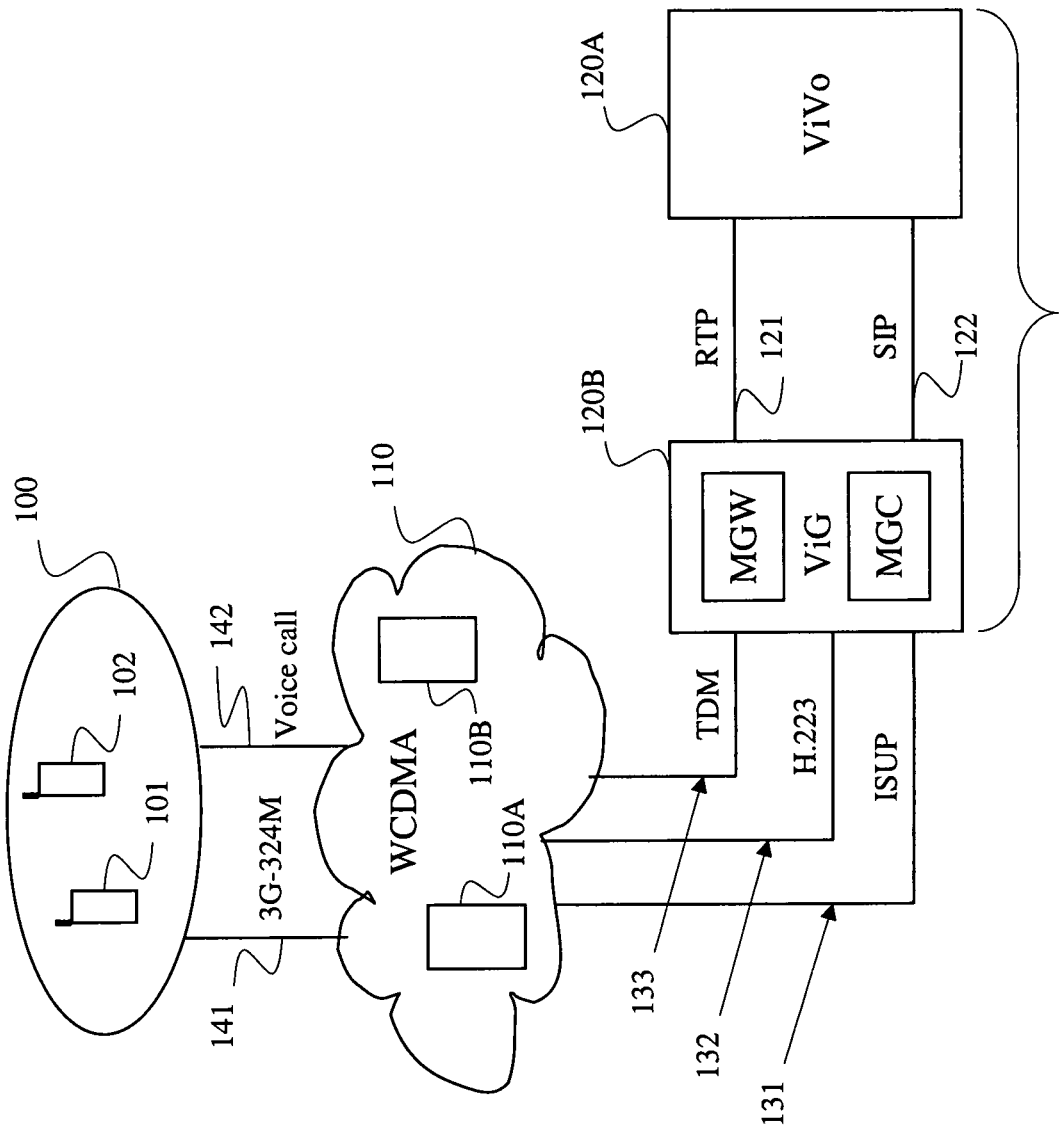
FIG. 7 is a schematic diagram representing a telecommunication network comprising Circuit Switched terminals, a Circuit Switched W-CDMA network and a Packet Switched interfaced Media Control Node.

FIG. 7 is a schematic diagram representing a telecommunication network comprising CS terminals, a CS W-CDMA network and a PS interfaced Media Control Node.

FIG. 7 depicts additional to the network configuration of FIG. 1, an embodiment of the ViG+ViVo 120 wherein the functionality of the ViVo 120A and the ViG 120B are not combined in one entity, as show e.g. in FIGS. 1 and 3, but in separate entities, representing the media gateway switching function 120A and the control function 120B. The ViVo 120A is connected via Packet Switched connections 121 and 122 to the ViG 120B. Connections 121 and 122 may be comprised by the Internet or an Intranet.

The functionality of the combination of ViVo 120A and ViG 120B is identical to the functionality of ViG+ViVo 120 described at the previous figures.

Figure 8:
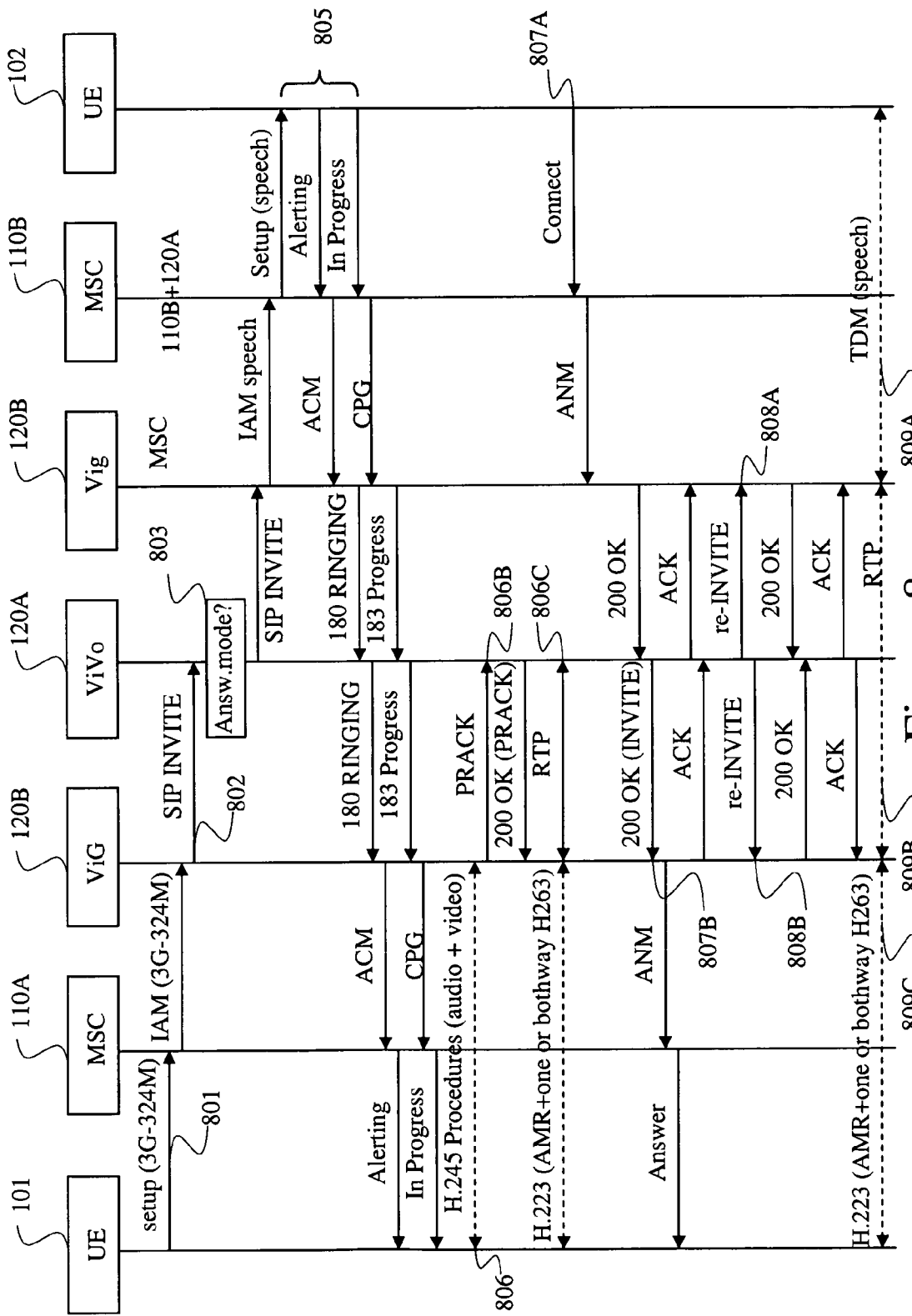
FIG. 8 is a schematic diagram of a Multi-Media call setup flow according to a voice answer mode with call setup answer by the called party in a circuit switched network with a Packet Switched Media Switching Node.

FIG. 8 is a schematic diagram of a Multi-Media call setup flow according to a voice answer mode with call setup answer by the called party in a CS network with a PS media control node according to the configuration of FIG. 7.

FIG. 8 presents a detailed signaling flow for a video call setup by the calling terminal 101 towards the called terminal 102 wherein the call setup is to be answered according to the answer mode variable of the called terminal as a voice call setup, equivalent to FIG. 2, but also showing the signaling between the ViVo 120A and the ViG 120B.

The ViG 120B is depicted twice as to present the invention more clear as a time related signal flow.

The ViG 120B may be implemented as a distributed entity, communicating by SIP and RTP protocols for signaling and media transport respectively. In case the ViG 120B is a single entity, a wired connection, or proprietary connection solution is to be applied At initialization 801 by the calling terminal 101 for a video call setup, a call setup request message is sent 802 via the W-CDMA network 110 to the ViG 120B, which transmits the request to the ViVo 120A as a SIP INVITE message. The ViVo 120A checks the current answer mode of called terminal 102, identical according to the description of FIG. 2 and when the answer mode is "voice" a SIP INVITE with a Session Description Protocol (SDP) session descriptor (SD) identifier comprising mandatory codecs is transmitted back to the ViG 120B to have the W-CDMA network 110 alert the called terminal 102 for a subsequent voice call setup 805. The called terminal 102 signals back the alerting action via the W-CDMA network 110 and the ViG 120B to the ViVo 120A. The ViG+ViVo 120A informs the calling terminal 101 of the call setup being in progress. Subsequently preparation for the video channel, such as exchanging 806 codec data, is performed and provisionally acknowledged 806B and a video and audio channel are established 806C. The provisional Acknowledge 806B may comprise a session description information of the calling terminal 101 and the VIG 120B to be used. The established video and audio channels 806C are used to stream video and voice data from a source, under control of the ViVo 120A to the calling terminal 101.

When the user of called terminal 102 answers 807A the alerted subsequent call setup 805, a connect message is sent via the W-CDMA network 110 and the ViG 120B towards the ViVo 120A, which signals an answer in response to the initial call setup 801 back to the calling terminal 101 via the ViG 120B and the W-CDMA network 110.

The SIP answer message corresponding to answer message 806B may comprise a session description information of the called terminal 102 and the ViG 120B, to be used by the ViVo 120A.

At this moment in the process as shown the W-CDMA network 110 has had the information to establish a video and audio channel between the calling terminal 101 and the ViG 120B, and has had the information to establish an audio channel between the ViG 120B and the called terminal 102. When the ViVo 120A orders 808A, 808B by means of re-INVITE messages the ViG 120B to connect both audio channels, an audio connection 809A, 809B, 809C is established between the calling terminal 101 and the called terminal 102. The re-INVITE messages 808A and 808B comprise the session description information of the opposite media switching function and terminal 102, 101.

Figure 9:
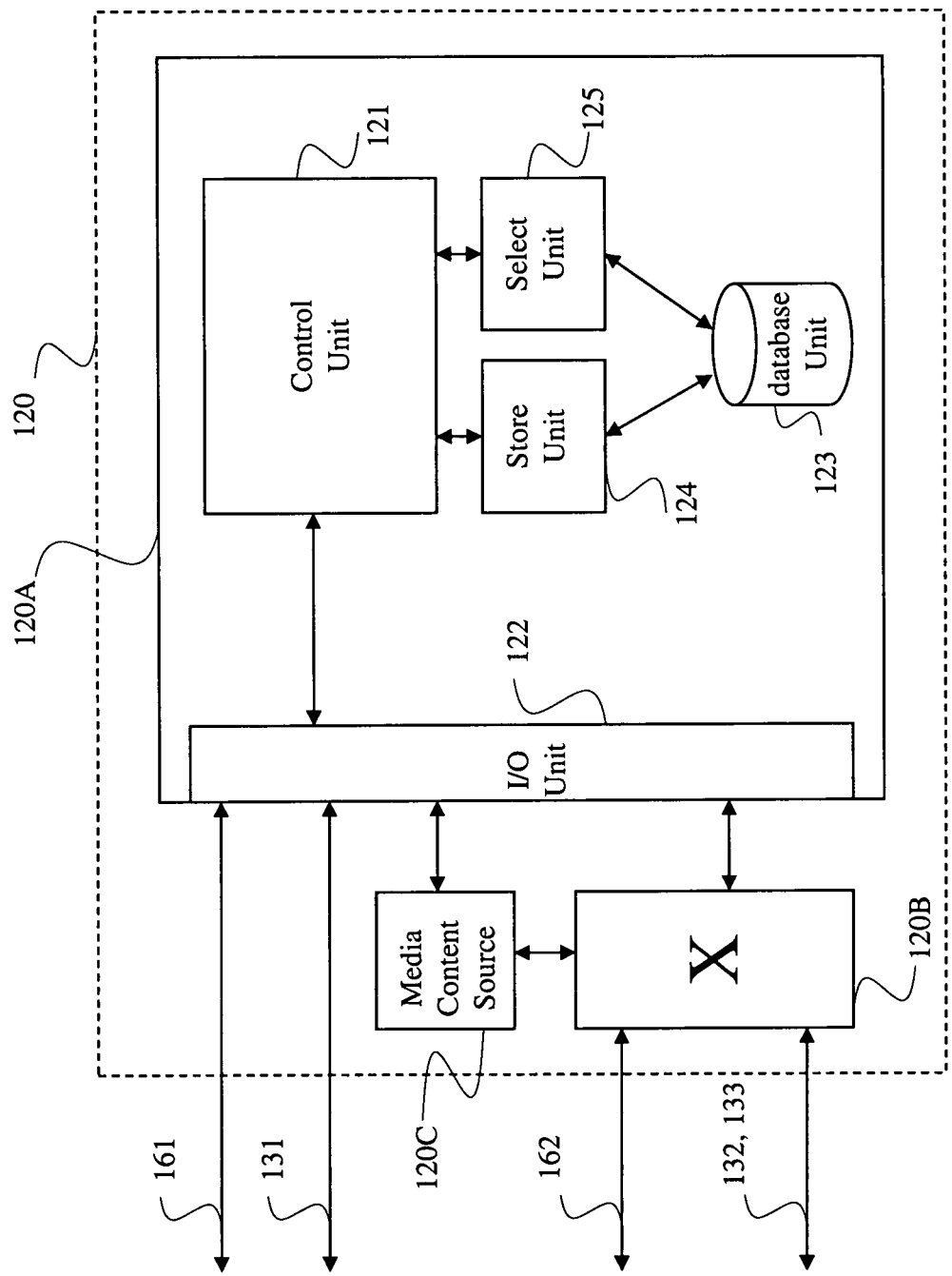
FIG. 9 is a schematic diagram representing a media switching node according to the invention.

FIG. 9 is a schematic diagram representing the media control, switching and gateway node according to the invention.

The ViG+ViVo 120 has a processing unit 121 for having executing its operating system an application software, and has an Input/Output (I/O) units 122A and 122B, for respectively communication for signaling messages and switching media.

Input/Output (I/O) unit 122A is communicatively connected to the processing unit 121 as a communication means with the Internet via connections 161 and with Circuit Switched networks, as the W-CDMA network 110 by means of connection 131 adapted for receiving and sending messages and instructions.

Input/Output (I/O) unit 122B is communicatively connected to the Internet via connection 162 and to a gateway switching function 120B, also denoted as the ViG 120B. I/O unit 122B is connected to the Internet via connections 162 and with Circuit Switched networks, as the W-CDMA network 110 by means of connections 132 and 133 adapted for media transport.

The ViG 120B is under control of ViVo 120A, represented by processing unit 121 and is arranged to switch media, also between PS and CS environments.

The processing unit comprises decision logic, timing logic and is connected to an internal memory for storing and retrieving program steps or variables.

The ViG+ViVo 120 is further equipped with a storing unit 124 arranged to store the answer mode variable, corresponding to the called terminal when provided to the ViG+ViVo via e.g. the Internet. The ViG+ViVo further is further comprised with a selecting unit 125 arranged to select the corresponding answer mode variable at step 203, 403, 503 and 803. both the storing unit 124 and the selecting unit 125 are communicatively connected to a database 123, which comprises the answer mode variable associated to the called terminal 102 and may also comprise video or audio ring back tones to be played out to the calling terminal 101, 105 during a call setup, a switch of the connection between voice and video initialized by the called terminal 102. The database can also be arranged to act as video mailbox in case the called terminal 102 is busy, does not answer or an incoming call setup for voice is rejected by the user.

In the examples above the answer mode variable, stored in the database 123 of ViVo 120A is to be changed by a specific action of the user of called terminal 102. It is an option to apply the current setting, which might be changed during a connection in case of switching by the predetermined key or string of keys, to be stored by storing init 124, such that the next call setup has the answer mode used at the last call.

Although the ViVo+ViG 120 is depicted and described in FIGS. 1, 3 and 7 as a separate entity in the network 110, the ViVo+ViG 120 or its components ViVo 120A or ViG 120B can be incorporated or integrated into the core network 110 into an MSC 110A, 110B for reasons of efficiency with respect to signaling, operational planning, maintenance or manufacturing.

Figure 10:
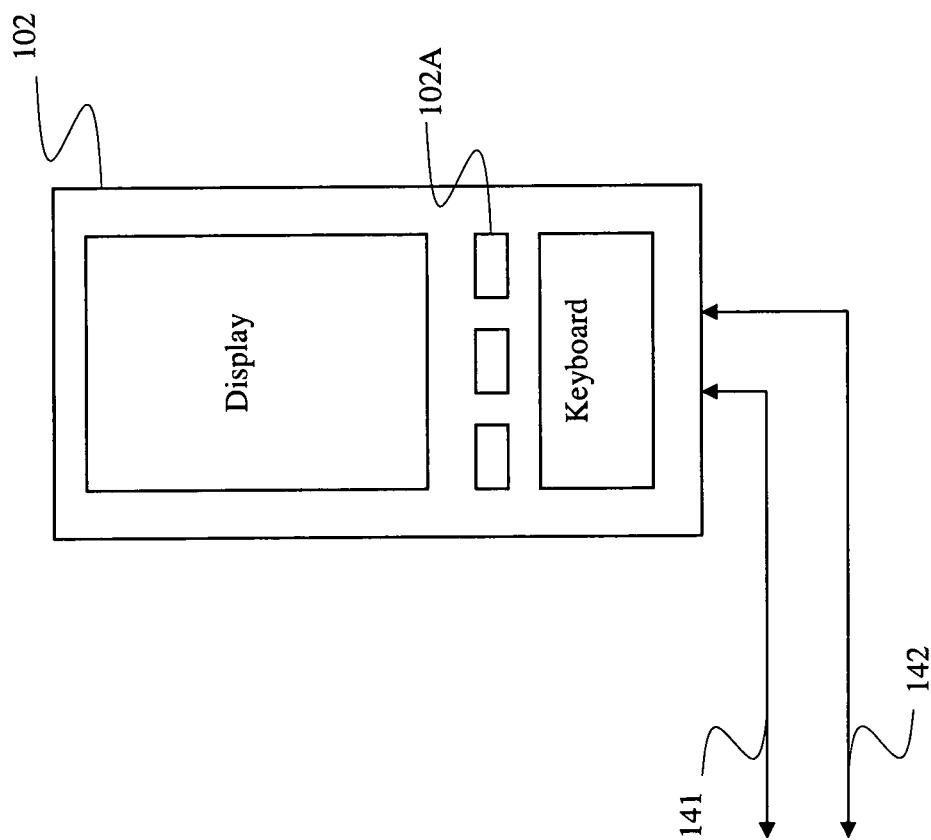
FIG. 10 is a schematic diagram of a terminal comprising a predetermined key arranged for signaling a network node for a call setup.

FIG. 10 is a schematic diagram of a terminal 102 comprising a predetermined key arranged for signaling a network node a request for setting up a call.

The electronic circuitry of terminal 102 is arranged such that when predetermined key 102A is activated, a signaling is sent via network connection 141 for a voice media call setup or via connection 142 for a voice call setup, via network 110 to the ViVo 120A. This key 102A is used for toggling between a voice and a video call media types during a call. Terminal 102, implemented as a Circuit Switched device applies Dual Tone Multi Frequency signaling and when implemented as an IP device, SIP signaling is used. FIG. 2, reference sign 208A, FIG. 4, reference sign 408A, and FIG. 6, reference sign 602 depict activation of key 102A and the subsequent switching action performed by the ViG+ViVo 120.

Figure 11:
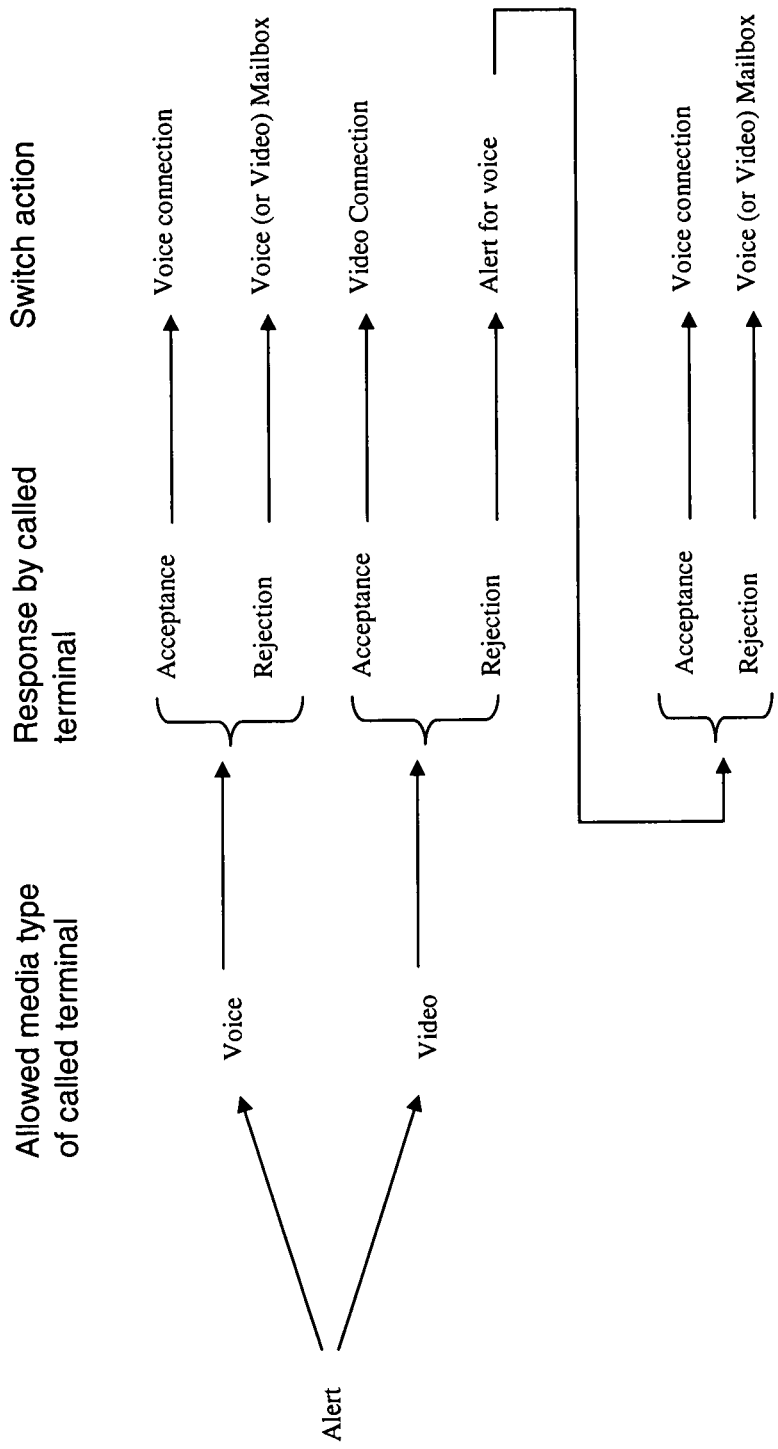
FIG. 11 is a schematic diagram representing a switch action scheme in relation to a response of the called terminal and the media type of the call setup.

FIG. 11 is a schematic diagram representing a switch action scheme in relation to a response of the called terminal and the media type of the call.

The invention offers the advantage that privacy intrusion by way of unpredicted scenes at the terminal's display and unwanted launch of the loudspeaker in the terminal can be prevented in a predetermined way, and the calling user is informed by way of a video text message or movie under control of the user of the called terminal.

A further advantage is that a user of Multi-Media capable terminal, when answering a Multi-Media call setup as a voice call setup still has the option to control a video content to the terminal of the calling party without revealing video contents captured by his own terminal.

A still further advantage that implementation of the invention offers is that although the method can be applied with state of the art terminals, not requiring an adaptation, the invention could be applied with terminals that have a dedicated key that when activated initialized a sequence to perform a toggle to a different media call type of an established call, or during a call setup initialize a call setup for a different media type. The dedicated key is easy to remember and simple to use.

A still further advantage is that a network node has the option to initialize a codec negotiation between the calling and the called terminal for an optimum connection, also in cases where the media for each terminal are different.

What is claimed is:

1. A method implemented by a media control entity for handling multimedia call setup in a telecommunication system, wherein the system includes a first terminal, a second terminal, and a media switching entity that is under control of the media control entity, wherein the first and second terminals are capable of performing multimedia calls comprising a plurality of media types, the method comprising:
   receiving a setup request for a multimedia call initialized by the first terminal,
   selecting from a database maintained by the media control entity information that indicates for which of the media types a call setup to the second terminal is allowed,
   initializing setup of a subsequent call to the second terminal that is of one or more media types indicated as allowed by the selected information,
   receiving a response to setup of the subsequent call, the response having been initialized by the second terminal, and
   instructing the media switching entity to switch the multimedia call to either the subsequent call, a video source under control of the second terminal, or a mailbox associated with the second terminal, depending on the received response and the one or more media types indicated as allowed by the selected information.

2. The method according to claim 1, wherein the received response indicates acceptance of the subsequent call by the second terminal, and wherein instructing the media switching entity comprises instructing the media switching entity to switch one or more channels between the first and the second terminal via the multimedia call and the subsequent call.

3. The method according to claim 2, wherein the selected information indicates that a voice media type is allowed, and wherein instructing the media switching entity comprises instructing the media switching entity to switch a voice channel between the first and second terminals via the multimedia call and the subsequent call, and to switch a video channel between said video source and the first terminal via the multimedia call.

4. The method according to claim 2, wherein the selected information indicates a video media type is allowed, and wherein instructing the media switching entity comprises instructing the media switching entity to switch a video channel between the first and second terminals via the multimedia call and the subsequent call.

5. The method according to claim 1, wherein the received response indicates rejection of the subsequent call by the second terminal.

6. The method according to claim 5, wherein the selected information indicates that a voice media type is allowed, and wherein instructing the media switching entity comprises instructing the media switching entity to switch a channel between the first terminal and said mailbox via the multimedia call.

7. The method according to claim 5, wherein the selected information indicates that a video media type is allowed, and wherein instructing the media switching entity comprises instructing the media switching entity to switch a channel between said video source and the first terminal via the multimedia call.

8. The method according to claim 7, further comprising, responsive to receiving the response indicating rejection of the subsequent call by the second terminal, determining that a switch to a voice call is requested by the second terminal, and instructing the media switching entity to switch a voice channel between the first and the second terminal via the multimedia call and the subsequent call.

9. The method according to claim 7, further comprising releasing the setup of the subsequent call and instructing the media switching entity to switch a channel between the first terminal and said mailbox via the multimedia call.

10. The method according to claim 1, further comprising negotiating for a common codec between the first terminal and the second terminal, or the mailbox associated with the second terminal.

11. A media control entity configured to handle setup of a multimedia call between a first terminal and a second terminal in a telecommunication network, wherein the media control entity is configured to control a media switching entity communicatively connected to the first and second terminals, wherein the first and second terminals are capable of performing multimedia calls comprising a plurality of media types, wherein the media control entity comprises:
   a selecting unit configured to select from a database unit information that indicates for which one or more media types a call setup to the second terminal is allowed, and
   a processing unit configured to:
     initialize setup of a subsequent call to the second terminal that is of one or more media types indicated by the selected information,
     receive a response to setup of the subsequent call, the response having been initialized by the second terminal, and
     instruct the media switching entity to switch the multimedia call to either the subsequent call, a video source under control of the second terminal, or a mailbox associated with the second terminal, depending on the received response and one or more media types indicated as allowed by the selected information.

12. The media control entity according to claim 11, wherein the processing unit is configured to instruct a video source to provide media content to the media switching entity, for providing the first terminal with that media content.

13. The media control entity according to claim 11, wherein the processing unit is configured to receive a predetermined signaling action initialized by the second terminal, and, in response to the signaling action, to submit a request for setting up a further subsequent call to the second terminal that is of a media type different from the media type applied in the subsequent call.

14. A terminal device configured for multimedia calls in a telecommunication network, wherein the terminal device comprises electronic circuitry that is configured, responsive to user activation of a predetermined key on the device, to:
  signal, as Dual Tone Multi Frequency signaling or IP signaling, a media control entity in the network to perform a rejection or release of a connection of a first media type between the media control entity and the terminal device; and
  initialize a call set up of a second media type for said connection to the terminal device, wherein the first and the second media types are different from one another.

* * * * *